(12) United States Patent
Iida et al.

(10) Patent No.: US 12,258,083 B2
(45) Date of Patent: Mar. 25, 2025

(54) STEER-BY-WIRE STEERING SYSTEM

(71) Applicants: Toyota Jidosha Kabushiki Kaisha, Toyota (JP); JTEKT CORPORATION, Kariya (JP)

(72) Inventors: Tomoyuki Iida, Nisshin (JP); Yuko Otsuka, Okazaki (JP); Atsushi Ishihara, Sakurai (JP); Junya Miyake, Okazaki (JP)

(73) Assignees: TOYOTA JIDOSHA KABUSHIKI KAISHA, Toyota (JP); JTEKT CORPORATION, Kariya (JP)

( * ) Notice: Subject to any disclaimer, the term of this patent is extended or adjusted under 35 U.S.C. 154(b) by 386 days.

(21) Appl. No.: 17/969,199

(22) Filed: Oct. 19, 2022

(65) Prior Publication Data

US 2023/0130446 A1    Apr. 27, 2023

(30) Foreign Application Priority Data

Oct. 21, 2021   (JP) ................. 2021-172531

(51) Int. Cl.
*B62D 6/00*    (2006.01)
*B62D 5/04*    (2006.01)
*B62D 5/00*    (2006.01)

(52) U.S. Cl.
CPC ............ *B62D 6/002* (2013.01); *B62D 6/008* (2013.01); *B62D 5/006* (2013.01); *B62D 5/0457* (2013.01)

(58) Field of Classification Search
CPC ................. B62D 6/002; B62D 6/008
See application file for complete search history.

(56) References Cited

U.S. PATENT DOCUMENTS

| 10,000,234 B2 * | 6/2018 | Kim | ............. B62D 6/003 |
| 2024/0383527 A1 * | 11/2024 | Fujimoto | ............. B62D 5/0487 |

FOREIGN PATENT DOCUMENTS

| JP | 2019-131072 A | 8/2019 | |
| JP | 2022-053436 A | 4/2022 | |
| WO | WO-2021106438 A1 * | 6/2021 | ......... B62D 15/0215 |
| WO | WO-2021157727 A1 * | 8/2021 | ......... B62D 15/0215 |

* cited by examiner

*Primary Examiner* — Kevin Hurley
(74) *Attorney, Agent, or Firm* — Sughrue Mion, PLLC

(57) ABSTRACT

A steer-by-wire steering system includes a controller configured to execute a steering control process and a determining process of determining a converted operation amount by converting an actual wheel steering amount to an operation amount of an operation member based on an inverse of a steering gear ratio. In the determining process, when the steering gear ratio abruptly changes, the controller converts a gap of the converted operation amount generated at a time point of occurrence of the abrupt change to a gap of the wheel steering amount to grasp a converted steering amount offset value. While gradually decreasing the converted steering amount offset value, the controller thereafter re-converts the converted steering amount offset value to the gap of the converted operation amount based on the inverse of the steering gear ratio to determine a converted operation amount correction value and corrects the converted operation amount based on the value.

6 Claims, 10 Drawing Sheets

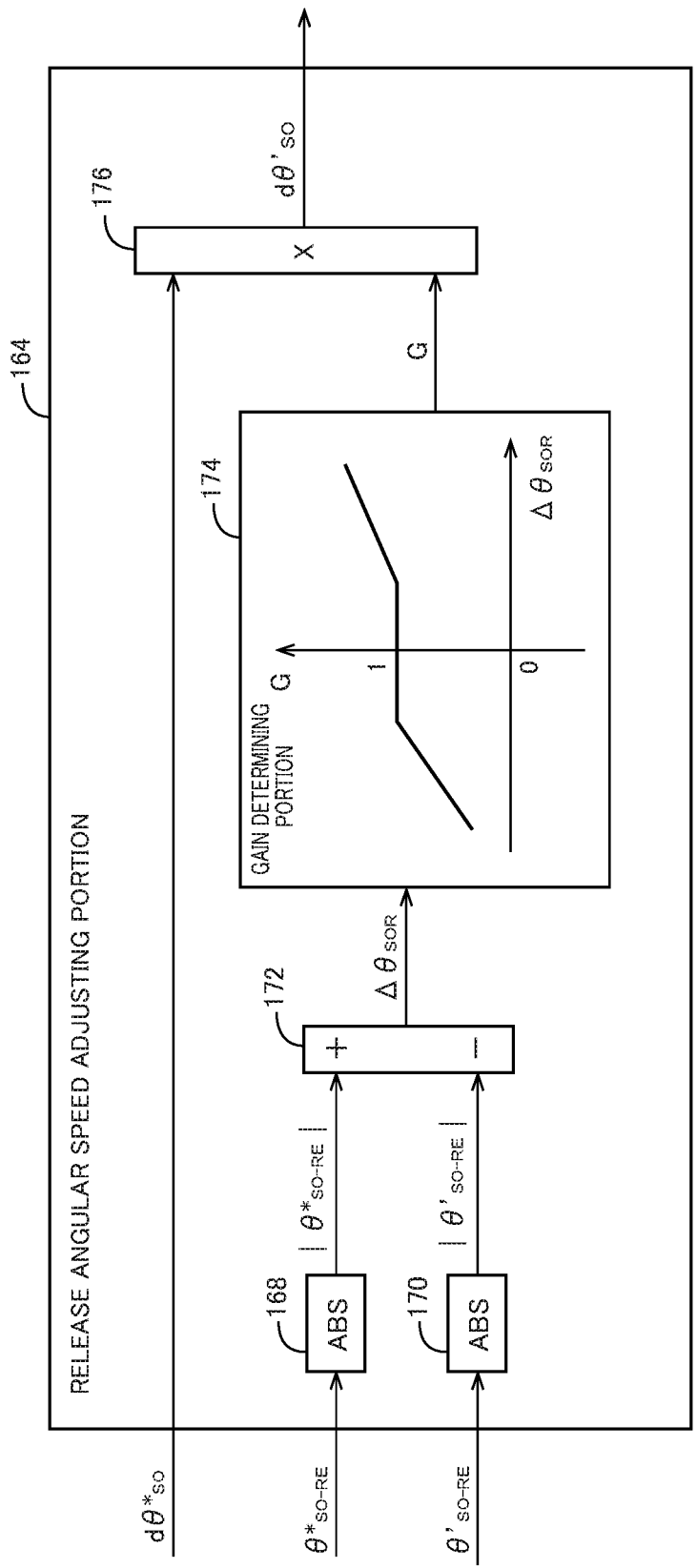

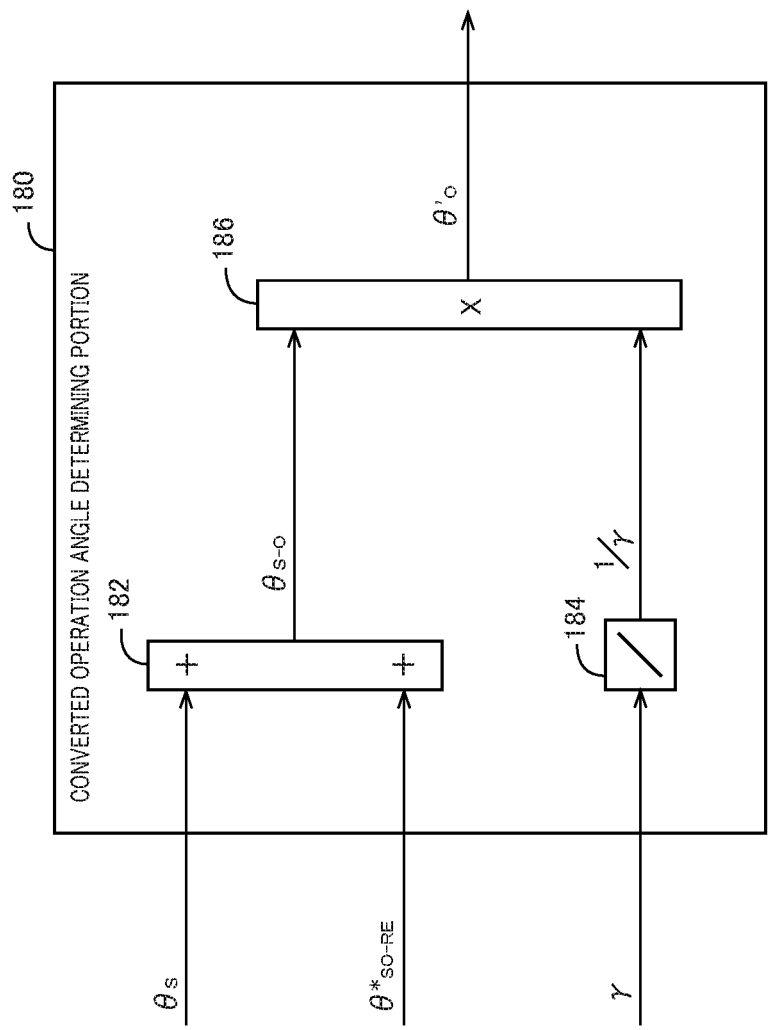

FIG.8A

CONVERTED OPERATION ANGLE DETERMINING PORTION 180

| | STEERING OF WHEEL FOLLOWS STEERING OPERATION | | STEERING OF WHEEL DOES NOT FOLLOW STEERING OPERATION | |
|---|---|---|---|---|
| | IMMEDIATELY BEFORE VEHICLE SPEED BECOMES UNAVAILABLE | IMMEDIATELY AFTER VEHICLE SPEED BECOMES UNAVAILABLE | IMMEDIATELY BEFORE VEHICLE SPEED BECOMES UNAVAILABLE | IMMEDIATELY AFTER VEHICLE SPEED BECOMES UNAVAILABLE |
| OPERATION ANGLE $\theta_o$ | 100deg | 100deg | 100deg | 100deg |
| GEAR RATIO $\gamma$ | 4.0 | 2.0 | 4.0 | 2.0 |
| STEERING ANGLE $\theta_s$ | 400deg | 400deg | 300deg | 300deg |
| TARGET STEERING OFFSET REMAINING ANGLE $\theta^*_{so-o}$ | 0deg | −200deg | 0deg | −200deg |
| OFFSET STEERING ANGLE $\theta_{s-o}$ | 400deg | 200deg | 300deg | 100deg |
| CONVERTED OPERATION ANGLE $\theta'_o$ | 100deg | 100deg | 75deg | 50deg |

FIG.8B

CONVERTED OPERATION ANGLE DETERMINING PORTION 104

| | STEERING OF WHEEL FOLLOWS STEERING OPERATION | | STEERING OF WHEEL DOES NOT FOLLOW STEERING OPERATION | |
|---|---|---|---|---|
| | IMMEDIATELY BEFORE VEHICLE SPEED BECOMES UNAVAILABLE | IMMEDIATELY AFTER VEHICLE SPEED BECOMES UNAVAILABLE | IMMEDIATELY BEFORE VEHICLE SPEED BECOMES UNAVAILABLE | IMMEDIATELY AFTER VEHICLE SPEED BECOMES UNAVAILABLE |
| OPERATION ANGLE $\theta_o$ | 100deg | 100deg | 100deg | 100deg |
| GEAR RATIO $\gamma$ | 4.0 | 2.0 | 4.0 | 2.0 |
| STEERING ANGLE $\theta_s$ | 400deg | 400deg | 300deg | 300deg |
| BASIC CONVERTED OPERATION ANGLE $\theta'_{o-B}$ | 100deg | 200deg | 75deg | 150deg |
| CONVERTED OPERATION ANGLE GAP $\Delta\theta'_o$ | 0deg | 100deg | 0deg | 75deg |
| CONVERTED STEERING ANGLE GAP $\Delta\theta'_s$ | 0deg | 200deg | 0deg | 150deg |
| CONVERTED STEERING OFFSET REMAINING ANGLE $\theta'_{so-RE}$ | 0deg | 200deg | 0deg | 150deg |
| CONVERTED OPERATION ANGLE CORRECTION VALUE $\theta'_{o-C}$ | 0deg | 100deg | 0deg | 75deg |
| CONVERTED OPERATION ANGLE $\theta'_o$ | 100deg | 100deg | 75deg | 75deg |

FIG.10A

CONVERTED OPERATION ANGLE DETERMINING PORTION 190

| | IMMEDIATELY BEFORE VEHICLE SPEED BECOMES UNAVAILABLE | IMMEDIATELY AFTER VEHICLE SPEED BECOMES UNAVAILABLE | OFFSET RELEASE PROCESS IS IN PROGRESS | |
|---|---|---|---|---|
| | | | GEAR RATIO DOES NOT CHANGE | GEAR RATIO CHANGES |
| OPERATION ANGLE $\theta_o$ | 100deg | 100deg | 105deg | 105deg |
| GEAR RATIO $\gamma$ | 4.0 | 2.0 | 2.0 | 2.05 |
| STEERING ANGLE $\theta_s$ | 400deg | 400deg | 407deg | 412.25deg |
| BASIC CONVERTED OPERATION ANGLE $\theta'_{o-B}$ | 100deg | 200deg | 203.5deg | 201.10deg |
| CONVERTED OPERATION ANGLE GAP $\Delta\theta'_o$ | 0deg | | | |
| CONVERTED OPERATION OFFSET REMAINING ANGLE $\theta'_{oo-RE}$ | 0deg | 100deg | 98.5deg | 98.5deg |
| CONVERTED OPERATION ANGLE CORRECTION VALUE $\theta'_{o-C}$ | | | | |
| CONVERTED OPERATION ANGLE $\theta'_o$ | 100deg | 100deg | 105deg | 102.60deg |

FIG.10B

CONVERTED OPERATION ANGLE DETERMINING PORTION 104

| | IMMEDIATELY BEFORE VEHICLE SPEED BECOMES UNAVAILABLE | IMMEDIATELY AFTER VEHICLE SPEED BECOMES UNAVAILABLE | OFFSET RELEASE PROCESS IS IN PROGRESS | |
|---|---|---|---|---|
| | | | GEAR RATIO DOES NOT CHANGE | GEAR RATIO CHANGES |
| OPERATION ANGLE $\theta_o$ | 100deg | 100deg | 105deg | 105deg |
| GEAR RATIO $\gamma$ | 4.0 | 2.0 | 2.0 | 2.05 |
| STEERING ANGLE $\theta_s$ | 400deg | 400deg | 407deg | 412.25deg |
| BASIC CONVERTED OPERATION ANGLE $\theta'_{o-B}$ | 100deg | 200deg | 203.5deg | 201.10deg |
| CONVERTED OPERATION ANGLE GAP $\Delta\theta'_o$ | 0deg | 100deg | | |
| CONVERTED STEERING OFFSET REMAINING ANGLE $\theta'_{so-RE}$ | 0deg | 200deg | 197deg | 197deg |
| CONVERTED OPERATION ANGLE CORRECTION VALUE $\theta'_{o-C}$ | 0deg | 100deg | 98.5deg | 96.10deg |
| CONVERTED OPERATION ANGLE $\theta'_o$ | 100deg | 100deg | 105deg | 105deg |

STEER-BY-WIRE STEERING SYSTEM

CROSS REFERENCE TO RELATED APPLICATION

The present application claims priority to Japanese Patent Application No. 2021-172531, which was filed on Oct. 21, 2021, the disclosure of which is herein incorporated by reference in its entirety.

BACKGROUND

Technical Field

The following disclosure relates to a steer-by-wire steering system for vehicles.

Description of Related Art

A steering system has been recently developed in which a steering device including a drive source enables a wheel to be steered in accordance with an operation of an operation member such as a steering wheel, without depending on an operation force applied to the operation member by a driver. That is, what is called steer-by-wire steering system (hereinafter referred to as "steer-by-wire system" where appropriate) has been developed. The steer-by-wire system enables the wheel to be steered such that a ratio of a steering amount of the wheel with respect to an operation amount of the operation member is equal to a set steering gear ratio, for instance. In the meantime, the steer-by-wire system is provided with a reaction force applying device as described in Japanese Patent Application Publication No. 2019-131072, for instance. The reaction force applying device is configured to apply, to the operation member, an operation reaction force that is a reaction force against the operation of the operation member by the driver (hereinafter referred to as "steering operation" where appropriate). The operation reaction force is controlled in the steer-by-wire steering system.

SUMMARY

For optimizing the operation reaction force in the steer-by-wire system, it is proposed, for instance, to convert an actual steering amount of the wheel to the operation amount of the operation member that is based on the actual steering amount (hereinafter referred to as "converted operation amount" where appropriate) by multiplying the actual steering amount of the wheel by an inverse of a steering gear ratio, so as to control the operation reaction force based on a difference between the converted operation amount and an actual operation amount. The difference between the converted operation amount and the actual operation amount will be hereinafter referred to as "operation amount deviation" where appropriate. In a case where the operation reaction force is thus controlled, it is important to grasp an appropriate converted operation amount for applying an appropriate operation reaction force. Application of an appropriate operation reaction force enables the utility of the steer-by-wire system to be enhanced. Accordingly, an aspect of the present disclosure relates to a steer-by-wire steering system with high utility.

In one aspect of the present disclosure, a steer-by-wire steering system for a vehicle includes: an operation member operable by a driver; a reaction force applying device configured to apply an operation reaction force to the operation member; a steering device configured to steer a wheel; and a controller configured to control the reaction force applying device and the steering device. The controller is configured to execute: a steering control process in which the controller determines a steering gear ratio and controls the steering device such that a ratio of a steering amount of the wheel with respect to an operation amount of the operation member becomes equal to the steering gear ratio; a converted operation amount determining process in which the controller converts an actual steering amount of the wheel to the operation amount of the operation member based on an inverse of the determined steering gear ratio, so as to determine a converted operation amount; and a reaction force control process in which, based on an operation amount deviation that is a difference between an actual operation amount of the operation member and the converted operation amount, the controller controls the reaction force applying device such that the operation reaction force increases with an increase in the operation amount deviation. In the converted operation amount determining process, when the determined steering gear ratio abruptly changes, the controller converts, based on the steering gear ratio, a gap of the converted operation amount generated at a time point of occurrence of the abrupt change to a gap of the steering amount of the wheel, so as to grasp the gap of the steering amount of the wheel as a converted steering amount offset value, the controller thereafter re-converts the converted steering amount offset value to the gap of the converted operation amount based on the inverse of the steering gear ratio while gradually decreasing the converted steering amount offset value, so as to determine a converted operation amount correction value, and the controller corrects the converted operation amount based on the converted operation amount correction value.

The steering gear ratio is typically variable in the steer-by-wire system. When the steering gear ratio abruptly changes, however, it may be difficult to grasp an appropriate converted operation amount in a case where actual steering of the wheel does not follow the operation of the operation member or in a case where the actual steering amount of the wheel is positively prevented from abruptly changing. In the steer-by-wire system according to the present disclosure, when the steering gear ratio abruptly changes, the correction process described above is executed in the converted operation amount determining process for correcting the converted operation amount. As a result, an appropriate converted operation amount can be obtained even when the steering gear ratio abruptly changes. This configuration enables an appropriate operation reaction force to be applied to the operation member, thus achieving the steering system with high utility.

Various Forms

The operation member in the steering system according to the present disclosure is typically a steering wheel, but may be a joystick, for instance. The reaction force applying device may be configured to include an electric motor as a drive source and to apply an urging force to the operation member based on a force of the electric motor, for instance. For instance, the steering device may be configured to include an electric motor as a drive source and to steer the wheel based on a force of the electric motor or may be configured to steer the wheel based on a hydraulic pressure of a working fluid, for instance.

In a case where the operation member is a steering wheel, the operation amount of the operation member is considered as an operation angle of the steering wheel, specifically, a rotational angle of the steering wheel from its posture in a straight traveling state of the vehicle. The steering amount of the wheel may be a turning angle of the wheel from its posture in the straight traveling state, i.e., an amount of change in a toe angle. In a case where the steering device includes a rod that connects the right and left wheels, the steering amount of the wheel may be an amount of a rightward or leftward movement of the rod from its neutral position (that is a position of the rod in the straight traveling state of the vehicle). In a case where the steering device includes a pinion that is in engagement with the rod, the steering amount of the wheel may be a rotational angle of the pinion from its rotational position in the straight traveling state of the vehicle.

The controller may be constituted by a computer, an ASIC, etc., and drive circuits (drivers) for drive sources of the reaction force applying device and the steering device, for instance. The steering control process, the reaction force control process, and the converted operation amount determining process are executed such that functional portions of the controller, namely, a steering control section, a reaction force control section, and a converted operation amount determining portion, execute arithmetic processing. The controller may be constituted by one unit including all the functional portions or may be constituted by a plurality of units each including one or more functional portions.

In the steering control process, the controller may determine, based on the actual operation amount of the operation member and the steering gear ratio, a target steering amount that is the steering amount of the wheel to be attained and may control the steering device such that the actual steering amount of the wheel becomes equal to the target steering amount. The steering system according to the present disclosure may be configured such that the steering gear ratio (hereinafter simply referred to as "gear ratio" where appropriate) is variable. That is, the present steering system may be what is called VGRS (variable gear ratio system). In this instance, in the steering control process, the controller may execute a gear ratio determining process in which the controller determines the gear ratio based on the operation amount of the operation member and a traveling speed of the vehicle (hereinafter referred to as "vehicle speed" where appropriate). In a case where the gear ratio is variable based on the vehicle speed, the controller may identify that the gear ratio abruptly changes when the vehicle speed is unavailable due to a failure of a vehicle speed sensor or the like.

In the reaction force control process, the controller may determine the operation reaction force to be applied by synthesizing a plurality of components and may control the reaction force applying device based on the determined operation reaction force. Examples of the plurality of components include an assist component for assisting an operation of the operation member by the driver, a steering-load-dependent component that is based on a load of the steering device with respect to steering of the wheel, and an operation-amount-deviation-dependent component that is based on the operation amount deviation described above. For grasping a discrepancy between the operation amount of the operation member and the steering amount of the wheel, the operation amount deviation is identified as the difference between the actual operation amount of the operation member and the converted operation amount. For instance, the operation amount deviation may be identified as a deviation of the converted operation amount with respect to the actual operation amount. In a case where steering of the wheel does not follow the operation of the operation member, the controller controls the reaction force applying device in the reaction force control process such that the operation reaction force increases, namely, the operation-amount-deviation-dependent component increases, with an increase in the operation amount deviation for the purpose of suppressing the operation of the operation member or for the purpose of causing the driver to be aware that steering of the wheel does not follow the operation of the operation member.

For identifying the operation amount deviation described above, the controller converts, in the converted operation amount determining process, the actual steering amount of the wheel to the operation amount of the operation member based on the inverse of the gear ratio (hereinafter referred to as "inverse gear ratio" where appropriate), so as to determine the converted operation amount. The abrupt change of the gear ratio causes an abrupt change of the inverse gear ratio, thus generating a gap of the converted operation amount, namely, a gap of the operation amount deviation. For obviating an abrupt change of the operation reaction force due to the gap of the operation amount deviation, the controller corrects the converted operation amount based on the converted operation amount correction value in the converted operation amount determining process, so as to gradually change the converted operation amount. For this reason, the converted operation amount correction value is determined as described above. The determination of the converted operation amount correction value will be later described in detail.

In a case where the controller is configured to determine the target steering amount as described above in the steering control process, the abrupt change of the gear ratio causes a gap to be generated in the determined target steering amount. In the steering control process, therefore, when the gear ratio abruptly changes, the controller preferably grasps the gap of the target steering amount generated at the time point of occurrence of the abrupt change as a target steering amount offset value, thereafter gradually decreases the target steering amount offset value to thereby determine a target steering amount correction value, and corrects the target steering amount based on the target steering amount correction value. In a case where such a correction process of correcting the target steering amount is executed, the controller preferably gradually decreases the converted steering amount offset value in accordance with the gradual decrease of the target steering amount offset value in the steering control process.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which:

FIG. 6 is a block diagram illustrating a functional configuration of a release angular speed adjusting portion of the converted operation angle determining portion illustrated in the block diagram of FIG. 5;

FIG. 7 is a block diagram illustrating a functional configuration of a converted operation angle determining portion as a comparative example different from the converted operation angle determining portion illustrated in the block diagram of FIG. 5;

FIG. 8A is a table for explaining results of a converted operation angle determining process executed by the converted operation angle determining portion according to the comparative example illustrated in the block diagram of FIG. 7;

FIG. 8B is a table for explaining results of a converted operation angle determining process executed by the converted operation angle determining portion according to the embodiment illustrated in the block diagram of FIG. 5;

FIG. 10A is a table for explaining results of a converted operation angle determining process executed by the converted operation angle determining portion according to another comparative example illustrated in the block diagram of FIG. 9; and FIG. 10B is a table for explaining results of the converted operation angle determining process executed by the converted operation angle determining portion according to the embodiment illustrated in the block diagram of FIG. 5.

DETAILED DESCRIPTION OF THE EMBODIMENT

Figure 1:
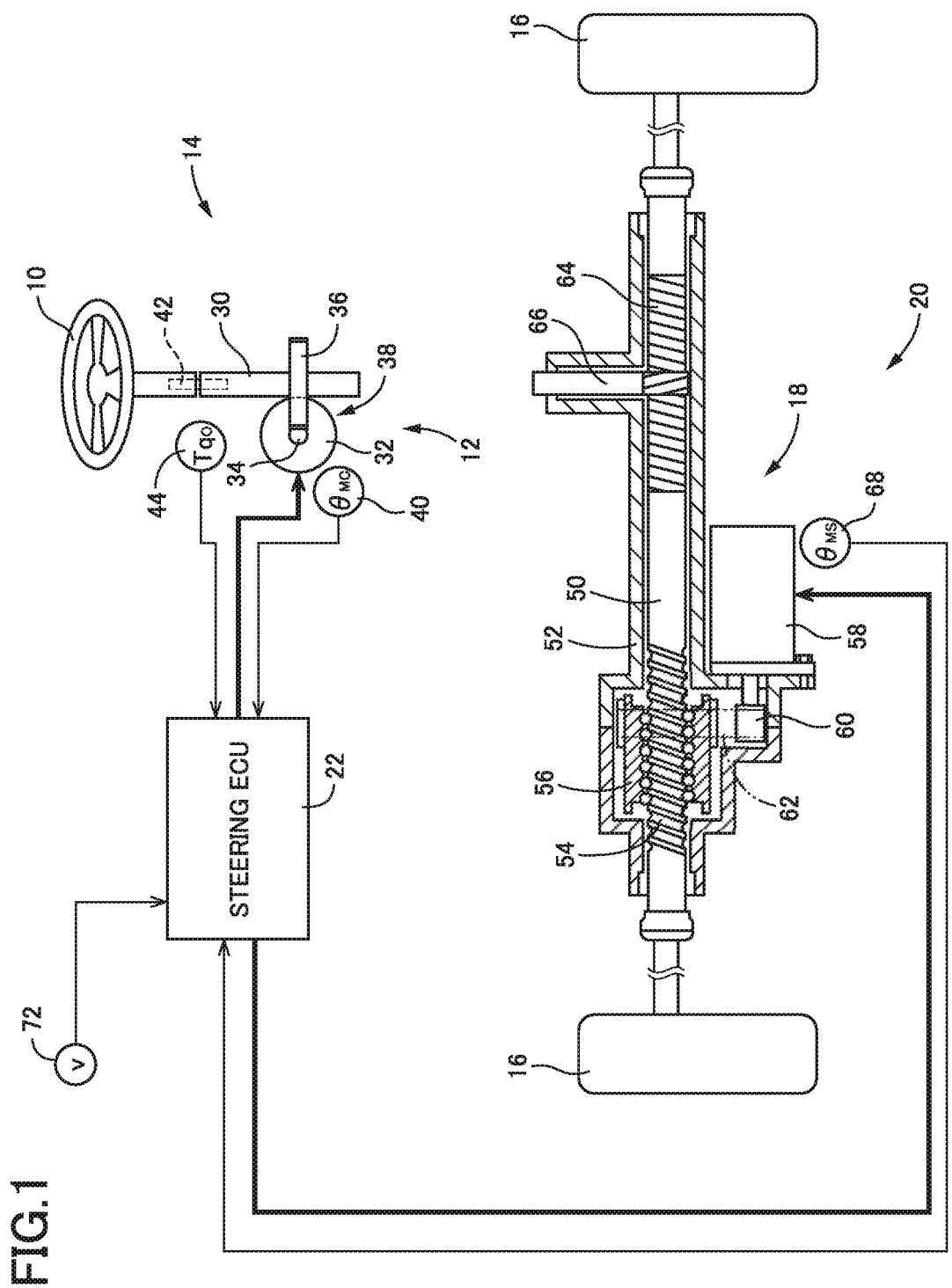
FIG. 1 is a view schematically illustrating a hardware configuration of a steering system according to one embodiment of the present disclosure.

Referring to the drawings, there will be described below in detail a steer-by-wire steering system according to one embodiment of the present disclosure. It is to be understood that the present disclosure is not limited to the details of the following embodiment but may be embodied based on the forms described in Various Forms and may be changed and modified based on the knowledge of those skilled in the art.

A. Hardware Configuration of Steering System

As schematically illustrated in FIG. 1, the steering system according to the present embodiment is a steer-by-wire steering system. The steering system includes: a steering wheel 10 (as one example of an operation member) operable by a driver; an operation portion 14 including a reaction force actuator 12 (as one example of a reaction force applying device) configured to apply an operation reaction force to the steering wheel 10; a steering portion 20 including a steering actuator 18 (as one example of a steering device) configured to steer a wheel 16; and a steering electronic control unit 22 (as one example of a controller) configured to control the reaction force actuator 12 and the steering actuator 18. The steering electronic control unit 22 will be hereinafter referred to as "steering ECU" where appropriate.

The operation portion 14 will be described. The steering wheel 10 is fixed to a distal end portion of a steering shaft 30. The reaction force actuator 12 includes: a reaction force motor 32, which is an electric motor and functions as a force generation source; and a speed reducing mechanism 38 including a worm 34 attached to a motor shaft of the reaction force motor 32 and a worm wheel 36 attached to the steering shaft 30. The reaction force actuator 12 generates a reaction force torque $Tq_C$ that depends on a motor torque of the reaction force motor 32. The reaction force actuator 12 applies the reaction force torque $Tq_C$ to the steering wheel 10 as an operation reaction force against an operation of the steering wheel 10.

The reaction force motor 32 is a three-phase brushless motor. The reaction force motor 32 includes a motor rotational angle sensor 40 for detecting a rotational phase of the motor shaft of the reaction force motor 32, that is, for detecting a rotational angle $\theta_{MC}$ of the reaction force motor 32, which will be hereinafter referred to as "reaction-force-motor rotational angle $\theta_{MC}$" where appropriate. The steering shaft 30 includes upper and lower shaft portions coupled to each other via a torsion bar 42. The operation portion 14 includes an operation torque sensor 44 for detecting a torsional amount of the torsion bar 42 to thereby detect an operation torque $Tq_O$ that the driver applies to the steering wheel 10. The operation torque is a subordinate concept of an operation force. The signal indicative of the reaction-force-motor rotational angle $\theta_{MC}$ detected by the motor rotational angle sensor 40 and the signal indicative of the operation torque $Tq_O$ detected by the operation torque sensor 44 are transmitted to the steering ECU 22.

The steering portion 20 will be described. The steering actuator 18 includes a steering rod 50 extending in the right-left direction and a housing 52 holding the steering rod 50 such that the steering rod 50 is movable in the right-left direction. A threaded groove 54 of a ball screw mechanism is formed on the steering rod 50. A nut 56 holding bearing balls and threadedly engaging the threaded groove 54 is held by the housing 52 so as to be rotatable and immovable in the right-left direction. A steering motor 58, which is an electric motor as a drive source, is attached to the housing 52. A timing belt 62 is looped over a pulley 60 attached to the motor shaft of the steering motor 58 and the outer circumferential portion of the nut 56 functioning as another pulley. Rotation of the motor shaft of the steering motor 58, namely, rotation of the steering motor 58, causes the nut 56 to be rotated to thereby move the steering rod 50 in the right-left direction. The steering rod 50 has right and left ends coupled, via respective link rods (not illustrated), to respective knuckle arms of right and left steering knuckles that rotatably hold the right and left wheels 16. The movement of the steering rod 50 in the right-left direction causes the right and left wheels 16 to be turned, namely, to be steered.

A rack 64 is formed on the steering rod 50, and a pinion shaft 66 meshing with the rack 64 is rotatably held by the housing 52. The steering actuator 18 of the steer-by-wire steering system according to the present embodiment need not have the rack 64 and the pinion shaft 66. In the present steering system, if the pinion shaft 66 and the steering shaft 30 of the operation portion 14 are coupled, an ordinary power steering system is constructed. That is, the present steering system is constructed by slightly modifying an ordinary power steering system. It is noted that the steering rod 50 with the rack 64 may also be referred to as a rack bar.

The steering motor 58 is a three-phase brushless motor. The steering motor 58 includes a motor rotational angle sensor 68 for detecting a rotational phase of a motor shaft of the steering motor 58, namely, for detecting a rotational angle $\theta_{MS}$ of the steering motor 58 (hereinafter referred to as "steering-motor rotational angle $\theta_{MS}$" where appropriate). The signal indicative of the steering-motor rotational angle $\theta_{MS}$ detected by the motor rotational angle sensor 68 is transmitted to the steering ECU 22.

The steering ECU 22 includes a computer constituted by a CPU, a ROM, a RAM, etc., an inverter functioning as a drive circuit for the reaction force motor 32, and an inverter functioning as a drive circuit for the steering motor 58. The steering ECU 22 receives the signal indicative of a traveling speed v of the vehicle (hereinafter referred to as "vehicle speed v" where appropriate) from a vehicle speed sensor 72 configured to detect the vehicle speed v.

B. Functions of Controller

Figure 2:
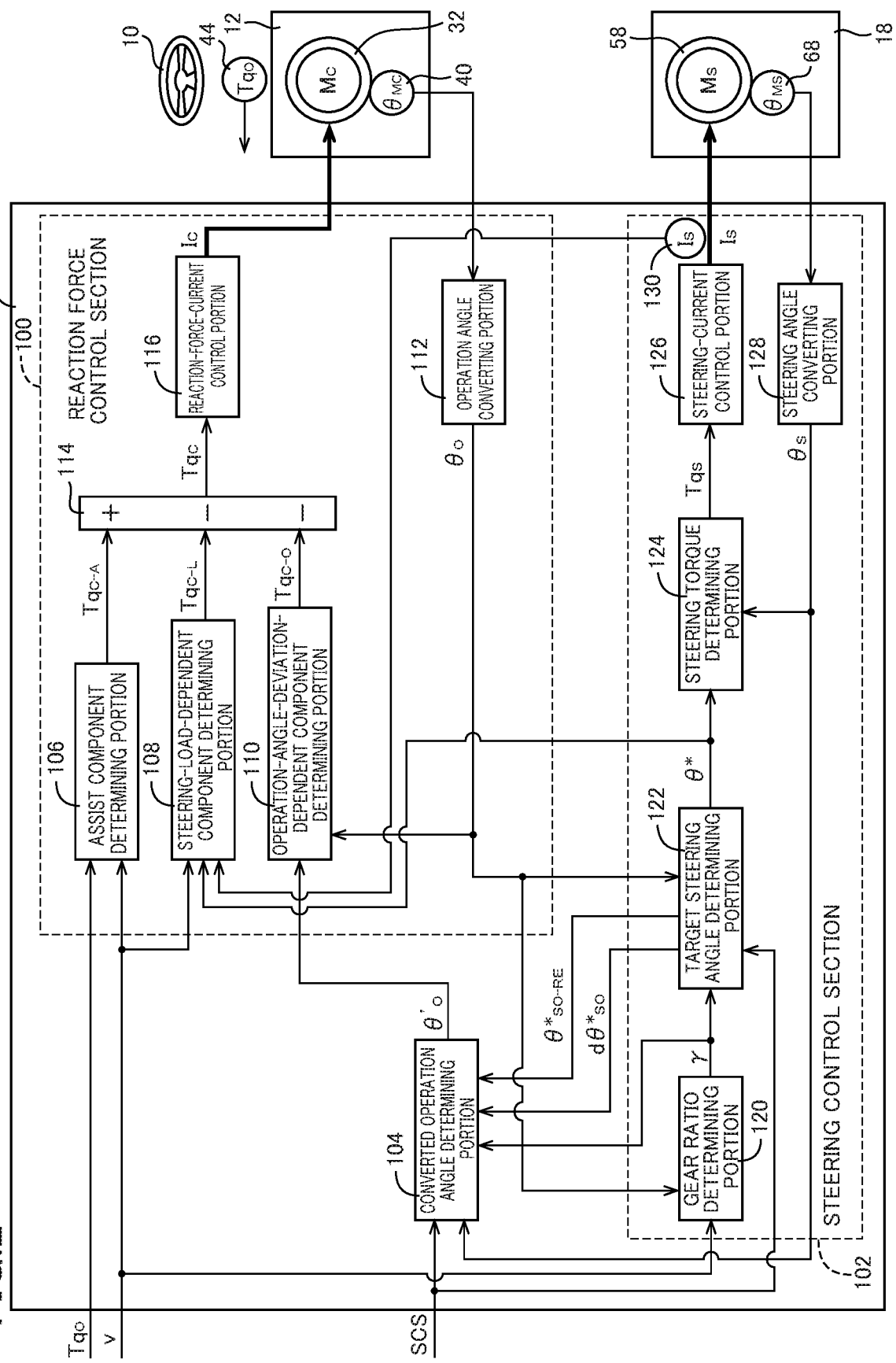
FIG. 2 is a block diagram illustrating a functional configuration of a controller of the steering system according to the embodiment.

The steering ECU 22, which is a controller for the present steering system, has a functional configuration illustrated in a functional block diagram of FIG. 2. The computer executes a predetermined program to effectuate the functional configuration. The functional configuration may be effectuated by a dedicated circuit such as an ASIC. The steering ECU 22 executes various kinds of processes in a control cycle of a relatively short time pitch of from several to several tens of milliseconds, for instance. The time pitch may be referred to as a control pitch.

The steering ECU 22 is classified roughly to a reaction force control section 100, a steering control section 102, and a converted operation angle determining portion 104 (as one example of a converted operation amount determining portion). The reaction force control section 100, the steering control section 102, and the converted operation angle determining portion 104 will be hereinafter described in detail.

To and from the constituent elements illustrated in FIG. 2, there are input and output signals indicative of values of a torque, components of the torque, a steering angle, an operation angle, etc. For avoiding redundancy of the description, the following description simply expresses in such a way that the torque, the components of the torque, the steering angle, the operation angle, etc., are input to and output from the constituent elements. In a case where the operation angle at the neutral position of the steering wheel 10 is defined as 0 and the steering angle at the neutral position of the wheel 16 is defined as 0, each of the operation angle and the steering angle takes a positive value when the steering wheel 10 or the wheel 16 shifts toward one of rightward and leftward directions from the neutral position and a negative value when the steering wheel 10 or the wheel 16 shifts toward the other of rightward and leftward directions from the neutral position. Each of the operation angle and the steering angle is treated in such a way that the greater the amount of shift from the neutral position, the greater the absolute value of the operation angle or the steering angle. The same applies to various parameters relating to the operation angle and the steering angle.

a. Reaction Force Control Section

The reaction force control section 100 is a functional portion configured to control a reaction force torque $Tq_C$ generated by the reaction force actuator 12. The reaction force torque $Tq_C$ is a subordinate concept of the operation reaction force. The reaction force control section 100 includes an assist component determining portion 106 for determining an assist component $Tq_{C-A}$, a steering-load-dependent component determining portion 108 for determining a steering-load-dependent component $Tq_{C-L}$, and an operation-angle-deviation-dependent component determining portion 110 for determining an operation-angle-deviation-dependent component $Tq_{C-O}$. Each of the assist component $Tq_{C-A}$, the steering-load-dependent component $Tq_{C-L}$, and the operation-angle-deviation-dependent component $Tq_{C-O}$ is a component of the reaction force torque $Tq_C$.

In the control of the present steering system, an operation angle $\theta_O$ of the steering wheel 10 is utilized as an operation amount of the operation member. Accordingly, the reaction force control section 100 includes an operation angle converting portion 112 for converting the reaction-force-motor rotational angle $\theta_{MC}$ detected by the motor rotational angle sensor 40 of the reaction force motor 32 to the operation angle $\theta_O$. The operation angle $\theta_O$ and a cumulative amount of the reaction-force-motor rotational angle $\theta_{MC}$ have a relationship to satisfy a speed reduction ratio of the speed reducing mechanism 38. The conversion of the reaction-force-motor rotational angle $\theta_{MC}$ to the operation angle $\theta_O$ is carried out based on the speed reduction ratio. Though not described in detail, the present steering system includes a sensor (not illustrated) for detecting the operation angle $\theta_O$ from the neutral position of the steering wheel 10 (that is a position of the steering wheel 10 in the straight traveling state of the vehicle). Based on the detection value of the sensor, a calibration of the operation angle $\theta_O$ converted by the operation angle converting portion 112 is carried out at predetermined timing.

The components of the reaction force torque $Tq_C$ described above are determined as follows. The assist component $Tq_{C-A}$ is a component similar to an assist force in what is called power steering. The assist component determining portion 106 determines the assist component $Tq_{C-A}$ based on the operation torque $Tq_O$ detected by the operation torque sensor 44 and the vehicle speed v detected by the vehicle speed sensor 72. In short, the assist component determining portion 106 determines the assist component $Tq_{C-A}$ to be a greater value with an increase in the operation torque $Tq_O$. Further, the assist component determining portion 106 determines the assist component $Tq_{C-A}$ to be a smaller value when the vehicle speed v is high for giving the driver a heavy operation feeling with respect to the operation of the steering wheel 10 and to be a greater value when the vehicle speed v is low for giving the driver a light operation feeling with respect to the operation of the steering wheel 10. The operation feeling felt by the driver will be hereinafter referred to as "steering operation feeling" or simply referred to as "operation feeling" where appropriate. The direction of the assist component $Tq_{C-A}$ is the same as a steering operation direction in which the steering wheel 10 is operated.

The steering-load-dependent component $Tq_{C-L}$ is considered as a main component of the reaction force torque $Tq_C$. The steering-load-dependent component $Tq_{C-L}$ is a component for causing the driver to feel a steering force necessary for steering the wheel 16. The steering-load-dependent component $Tq_{C-L}$ may be considered as a component based on a force that acts on the steering rod 50 of the steering actuator 18 in the axial direction of the steering rod 50, i.e., the axial force. The steering-load-dependent component $Tq_{C-L}$ is a component for causing the driver to also feel a force that acts on the wheel 16 from the road surface, in addition to the steering force described above.

Specifically, the steering-load-dependent component $Tq_{C-L}$ includes: a theoretical component that is based on the steering angle θ of the wheel 16 and the vehicle speed v; and an actual-load-dependent component that is based on an actual load of the steering actuator 18. The steering-load-dependent component determining portion 108 determines these components and sums up these components to thereby determine the steering-load-dependent component $Tq_{C-L}$. The direction of the steering-load-dependent component $Tq_{C-L}$ is opposite to the steering operation direction.

The theoretical component is a component that does not take account of friction between the road surface and the wheel 16. The theoretical component may be considered as a component that takes account of the self-aligning torque of the wheel 16. Specifically, the theoretical component is determined based on the vehicle speed v detected by the vehicle speed sensor 72 and a target steering angle $\theta_S^*$ that is the steering angle $\theta_S$ to which the wheel 16 should be steered. (The target steering angle $\theta_S^*$ may be considered as a target value in the steering control of the wheel 16.) In short, the theoretical component is determined in consideration of the self-aligning torque of the wheel 16 so as to be a greater value with an increase in the target steering angle $\theta_S^*$ and with an increase in the vehicle speed v. Here, it is considered that the load of the steering actuator 18 is proportional to a steering current $I_S$, which is a supply current to the steering motor 58. Thus, the actual-load-dependent component is determined based on the steering current $I_S$ so as to be a greater value with an increase in the steering current $I_S$.

The operation-angle-deviation-dependent component $Tq_{C-O}$ is a component that takes account of a discrepancy between the operation angle $\theta_O$ of the steering wheel 10 and the steering angle $\theta_S$ of the wheel 16, specifically, a discrepancy between: a relationship between the operation angle $\theta_O$ and the steering angle $\theta$s; and a relationship corresponding to a steering gear ratio $\gamma$ (hereinafter simply referred to as "gear ratio $\gamma$" where appropriate). In a case where the wheel 16 hits on an obstacle such as a curb or a ditch or in a case where power supply from a power source to the steering motor 58 is limited for protection of the steering actuator 18 etc., there may be a possibility that steering of the wheel 16 does not follow the steering operation. When the discrepancy described above is large, it is desirable to increase the reaction force torque $Tq_C$ for the purpose of limiting the steering operation. In the present steering system, therefore, an actual steering angle $\theta_S$ is converted to the operation angle $\theta_O$ based on an inverse of the gear ratio $\gamma$ (hereinafter referred to as "inverse gear ratio $1/\gamma$" where appropriate), so as to obtain a converted operation angle $\theta'_O$ (as one example of a converted operation amount). The operation-angle-deviation-dependent component determining portion 110 determines the operation-angle-deviation-dependent component $Tq_{C-O}$ to be a greater value with an increase in an operation angle deviation $\Delta\theta_O$ (as one example of an operation amount deviation), which is a difference between the converted operation angle $\theta'_O$ and an actual operation angle $\theta_O$ input from the operation angle converting portion 112. Like the direction of the steering-load-dependent component $Tq_{C-L}$, the direction of the operation-angle-deviation-dependent component $Tq_{C-O}$ is opposite to the steering operation direction. The converted operation angle $\theta'_O$ is determined by the converted operation angle determining portion 104. A procedure of determining the converted operation angle $\theta'_O$, namely, the functional configuration of the converted operation angle determining portion 104, will be later described in detail.

The assist component $Tq_{C-A}$ determined by the assist component determining portion 106, the steering-load-dependent component $Tq_{C-L}$ determined by the steering-load-dependent component determining portion 108, and the operation-angle-deviation-dependent component $Tq_{C-O}$ determined by the operation-angle-deviation-dependent component determining portion 110 (as one example of an operation-amount-deviation-dependent component determining portion) are input to an adder-subtractor 114, so that the reaction force torque $Tq_C$ to be applied is determined.

The reaction force torque $Tq_C$ output from the adder-subtractor 114 is input to a reaction-force-current control portion 116. The reaction-force-current control portion 116 includes an inverter that is a drive circuit (driver) for the reaction force motor 32. The reaction-force-current control portion 116 determines a reaction force current $I_C$ to be supplied to the reaction force motor 32 based on the reaction force torque $Tq_C$ input thereto and supplies the reaction force current $I_C$ from the inverter to the reaction force motor 32.

b. Steering Control Section

The steering control section 102 is a functional portion configured to control the steering angle $\theta_S$ of the wheel 16 steered by the steering actuator 18, which is the steering device. The steering control section 102 includes a gear ratio determining portion 120, a target steering angle determining portion 122, a steering torque determining portion 124, and a steering-current control portion 126.

In the control of the present steering system, the steering angle $\theta_S$ is utilized as the steering amount of the wheel 16. Thus, the steering control section 102 includes a steering angle converting portion 128 for converting the steering-motor rotational angle $\theta_{MS}$ detected by the motor rotational angle sensor 68 of the steering motor 58 to the steering angle $\theta_S$. In this respect, though a toe angle of the wheel 16 may be employed as the steering angle $\theta_S$, the rotational angle of the pinion shaft 66 is employed as the steering angle $\theta_S$ in the control of the present steering system. The steering angle $\theta_S$ and a cumulative amount of the steering-motor rotational angle $\theta_{MS}$ have a relationship to satisfy a predetermined speed reduction ratio, namely, a speed reduction ratio determined based on the speed reducer of the steering motor 58, the lead angle of the ball screw mechanism of the steering actuator 18, the diameter of the pinion shaft 66 of the steering actuator 18, etc. Thus, conversion of the steering-motor rotational angle $\theta_{MS}$ to the steering angle $\theta_S$ is carried out based on the speed reduction ratio. Though not described in detail, the present steering system includes a sensor (not illustrated) for detecting a rotational angle of the pinion shaft 66 from a rotational position thereof in the straight traveling state the wheel 16. Based on the detection value of the sensor, a calibration of the steering angle $\theta_S$ converted by the steering angle converting portion 128 is carried out at predetermined timing.

Figure 3:
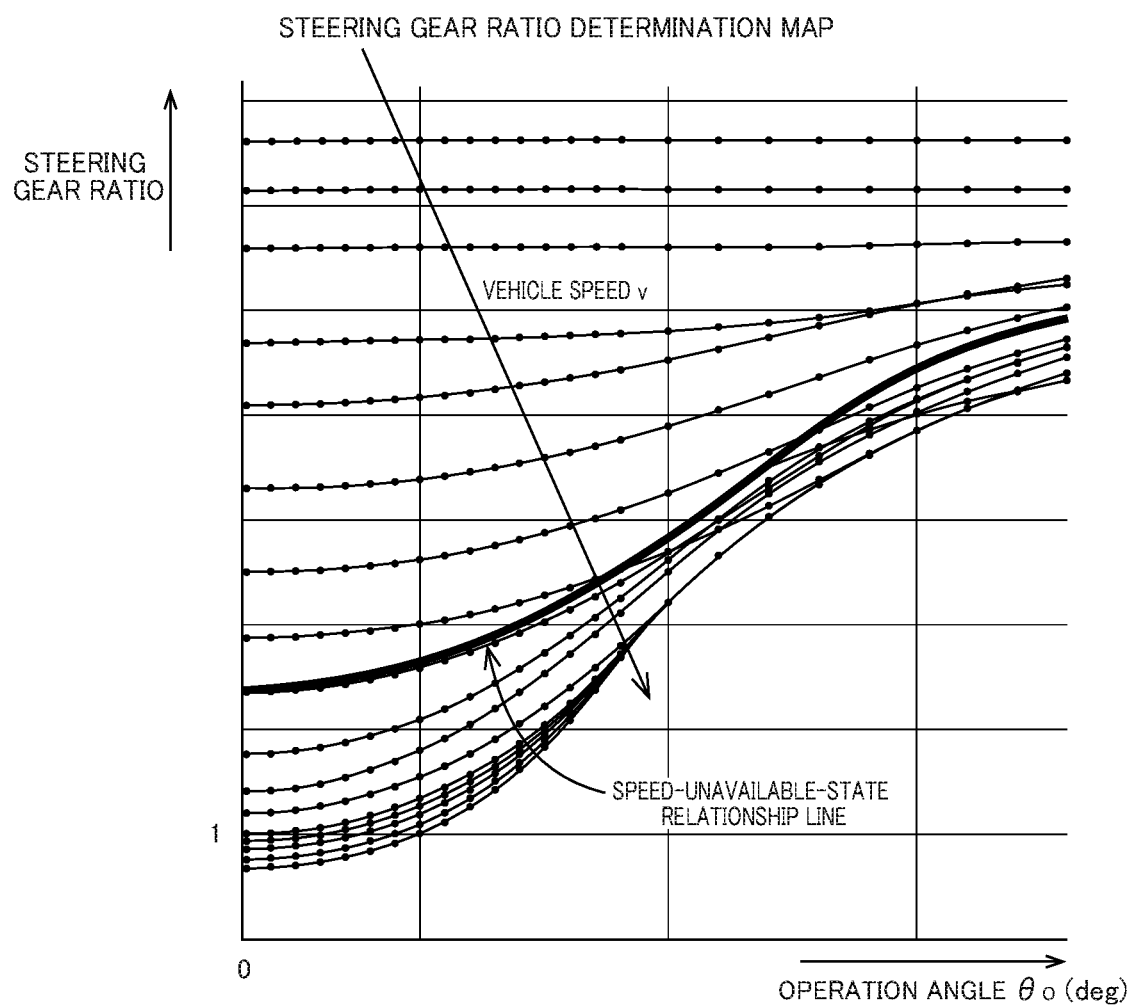
FIG. 3 is a graph illustrating a steering gear ratio determination map utilized in determining a steering gear ratio in the steering system according to the embodiment.

The gear ratio determining portion 120 determines the gear ratio based on the actual operation angle $\theta_O$ input from the operation angle converting portion 112 and the vehicle speed v detected by the vehicle speed sensor 72 referring to a steering gear ratio determination map in the form of a graph of FIG. 3. (The steering gear ratio determination map will be simply referred to as "gear ratio determination map" where appropriate.) The gear ratio $\gamma$ is a ratio of the steering angle $\theta_S$ with respect to the operation angle $\theta_O$. The gear ratio $\gamma$ is represented as the following equation: $\gamma = \theta_S/\theta_O$. According to the gear ratio determination map of FIG. 3, the gear ratio $\gamma$ is determined to be a smaller value with an increase in the vehicle speed v, in other words, the gear ratio $\gamma$ is determined to be a greater value with a decrease in the vehicle speed v, thus achieving an improvement in the stability of the vehicle in turning when the vehicle speed v is high and an improvement in turning performance when the vehicle speed v is low. In particular, the gear ratio $\gamma$ in a region, in which the operation angle $\theta_O$ is small when the vehicle speed v is high, is determined to be a considerably small value. In the gear ratio determination map of FIG. 3, a bold line (indicated by "speed-unavailable-state relationship line") is a line representing a relationship between the operation angle $\theta_O$ and the gear ratio $\gamma$ employed when the information on the vehicle speed v is unavailable due to a failure of the vehicle speed sensor 72, for instance, namely, when the steering system is in a "vehicle-speed unavailable state". In the vehicle-speed unavailable state, the gear ratio $\gamma$ is determined referring to the speed-unavailable-state relationship line. The gear ratio $\gamma$ determined by the gear ratio determining portion 120 is sent to the target steering angle determining portion 122 and the converted operation angle determining portion 104.

The target steering angle determining portion 122 determines the target steering angle $\theta_S^*$ (as one example of a target steering amount), which is a control target of the steering angle $\theta_S$ of the wheel 16, based on the operation angle $\theta_O$ input from the operation angle converting portion 112 of the reaction force control section 100 and the gear ratio $\gamma$ determined by the gear ratio determining portion 120. The determined target steering angle $\theta_S^*$ is sent to the steering torque determining portion 124 and the steering-load-dependent component determining portion 108 of the reaction force control section 100. A procedure of determining the target steering angle $\theta_S^*$ by the target steering angle determining portion 122, namely, the functional configuration of the target steering angle determining portion 122, will be later described in detail.

The steering torque determining portion 124 is a functional portion configured to determine a steering torque $Tq_S$ (as one example of the steering force) necessary for steering the wheel 16. The steering torque $Tq_S$ may be considered as a torque to be generated by the steering motor 58, for instance. Specifically, the steering torque determining portion 124 determines a steering angle deviation $\Delta\theta_S$, which is a deviation of the steering angle $\theta_S$ with respect to the target steering angle $\theta_S^*$, based on the actual steering angle $\theta_S$ at the present time point converted by the steering angle converting portion 128 and the target steering angle $\theta_S^*$ determined by the target steering angle determining portion 122. The steering torque $Tq_S$ is determined based on the thus determined steering angle deviation $\Delta\theta_S^*$ according to a PID feedback control law. The technique according to the feedback control law is known, a detailed description of which is dispensed with.

The steering-current control portion 126 includes an inverter that is a drive circuit (driver) for the steering motor 58. Based on the steering torque $Tq_S$ determined by the steering torque determining portion 124, the steering-current control portion 126 determines the steering current $I_S$, which is a current to be supplied to the steering motor 58, and supplies the steering current $I_S$ to the steering motor 58 from the inverter. The steering ECU 22 includes a current sensor 130 for detecting the steering current $I_S$ supplied to the steering motor 58. The steering current $I_S$ detected by the current sensor 130 is sent to the steering-load-dependent component determining portion 108 of the reaction force control section 100 so as to be utilized in determining the steering-load-dependent component $Tq_{C-L}$ described above.

Figure 4:
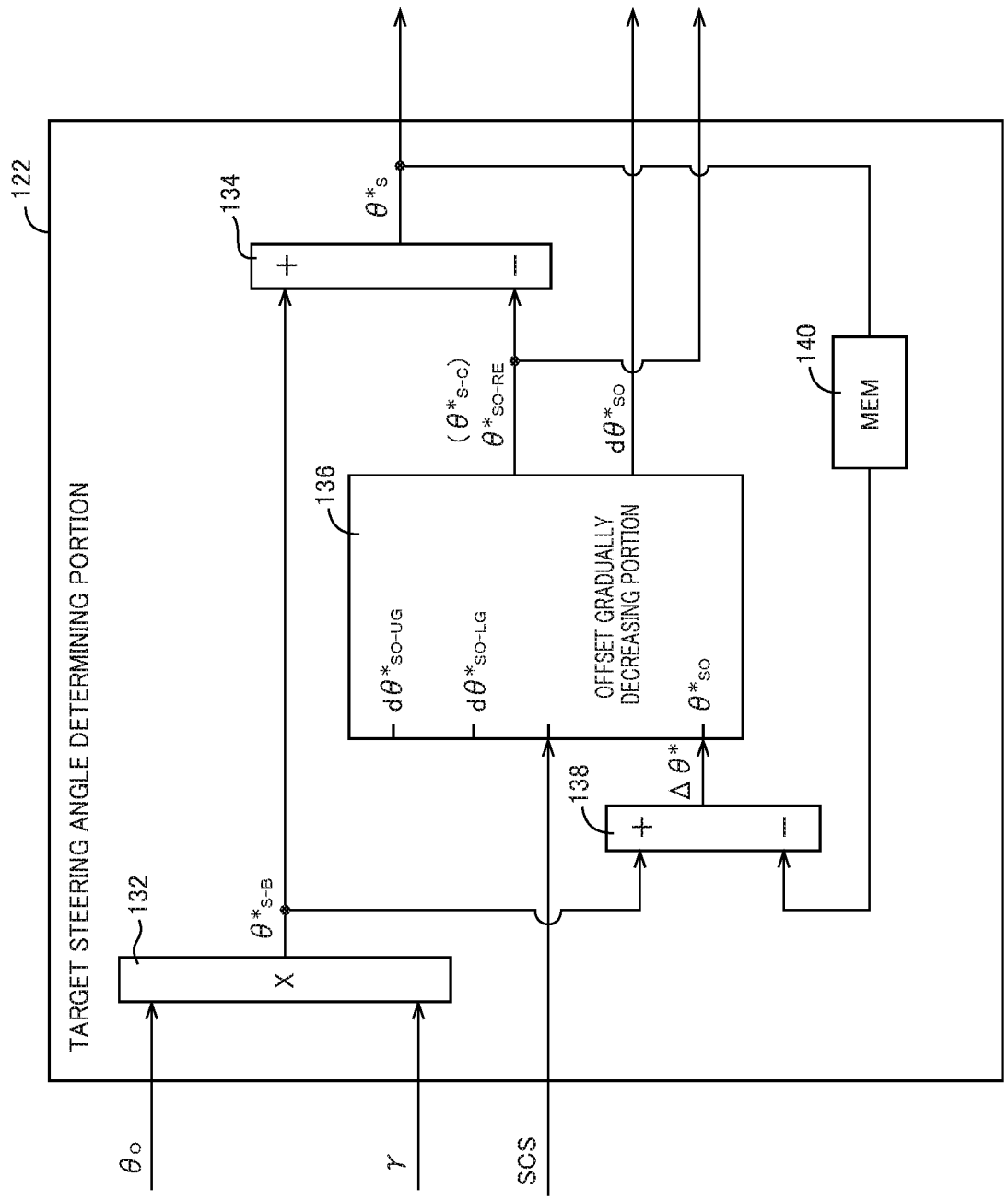
FIG. 4 is a block diagram illustrating a functional configuration of a target steering angle determining portion of the controller of the steering system according to the embodiment.

The target steering angle determining portion 122 has a functional configuration illustrated in a functional block diagram of FIG. 4. The target steering angle determining portion 122 includes a multiplier 132. The operation angle $\theta_O$ of the steering wheel 10 and the gear ratio $\gamma$ are input to the multiplier 132 respectively from the operation angle converting portion 112 and the gear ratio determining portion 120. The multiplier 132 multiplies the operation angle $\theta_O$ and the gear ratio $\gamma$ to thereby determine a basic target steering angle $\theta_{S-B}^*$, which is a base of the target steering angle $\theta_S^*$.

The basic target steering angle $\theta_{S-B}^*$ is input to an adder-subtractor 134. A target steering angle correction value $\theta_{S-C}^*$ (as one example of a target steering amount correction value) that will be described is also input to the adder-subtractor 134. In the adder-subtractor 134, the basic target steering angle $\theta_{S-B}^*$ is corrected based on the target steering angle correction value $\theta_{S-C}^*$, so that the target steering angle $\theta_S^*$ is determined.

The target steering angle determining portion 122 includes an offset gradually decreasing portion 136. The offset gradually decreasing portion 136 determines the target steering angle correction value $\theta_{S-C}^*$ described above. The offset gradually decreasing portion 136 determines the target steering angle correction value $\theta_{S-C}^*$ to allow the target steering angle $\theta_S^*$ to change gently for enabling smooth steering of the wheel 16 in a case where the basic target steering angle $\theta_{S-B}^*$ abruptly changes due to an abrupt change of the gear ratio $\gamma$, for instance, in other words, in a case where the basic target steering angle $\theta_{S-B}^*$ changes stepwise comparatively largely.

Specifically, the target steering angle determining portion 122 includes an adder-subtractor 138 and a previous value memory 140. There is input, to the offset gradually decreasing portion 136, a target steering angle gap $\Delta\theta^*$ (as one example of a target steering amount gap), which is a difference between the basic target steering angle $\theta_{S-B}^*$ in the current control cycle and the target steering angle $\theta_S^*$ in the previous control cycle. In a case where a situation in which the gear ratio $\gamma$ abruptly changes occurs, a steering-state change signal SCS is input to the offset gradually decreasing portion 136. The offset gradually decreasing portion 136 grasps the target steering angle gap $\Delta\theta^*$ at a time point of input of the steering-state change signal SCS, namely, at a time point of occurrence of the abrupt change of the gear ratio $\gamma$, as a target steering angle offset value $\theta_{SO}^*$ (as one example of a target steering amount offset value). In the control cycle thereafter, the offset gradually decreasing portion 136 gradually decreases the target steering angle offset value $\theta_{SO}^*$ to 0 at an angular speed whose value is not greater than an upper limit value $d\theta_{SO-UG}^*$ and not less than a lower limit value $d\theta_{SO-LG}^*$. That is, an offset release process is executed. In this respect, the upper limit value is a value for limiting the rate of change, i.e., a guard value, when bringing a negative target steering angle offset value $\theta_{SO}^*$ closer to 0 while a lower limit value is a value for limiting the rate of change when bringing a positive target steering angle offset value $\theta_{SO}^*$ closer to 0. Every time the control cycle proceeds, the offset gradually decreasing portion 136 outputs the gradually decreased target steering angle offset value $\theta_{SO}^*$ as a target steering offset remaining angle $\theta_{SO-RE}^*$. The target steering offset remaining angle $\theta_{SO-RE}^*$ corresponds to the target steering angle correction value $\theta_{S-C}^*$. The target steering offset remaining angle $\theta_{SO-RE}^*$ is output to the converted operation angle determining portion 104. An offset release angular speed $d\theta_{SO}^*$ is also output to the converted operation angle determining portion 104. The offset release angular speed $d\theta_{SO}^*$ is the angular speed at which the target steering angle offset value $\theta_{SO}^*$ is gradually decreased.

c. Converted Operation Angle Determining Portion

Figure 5:
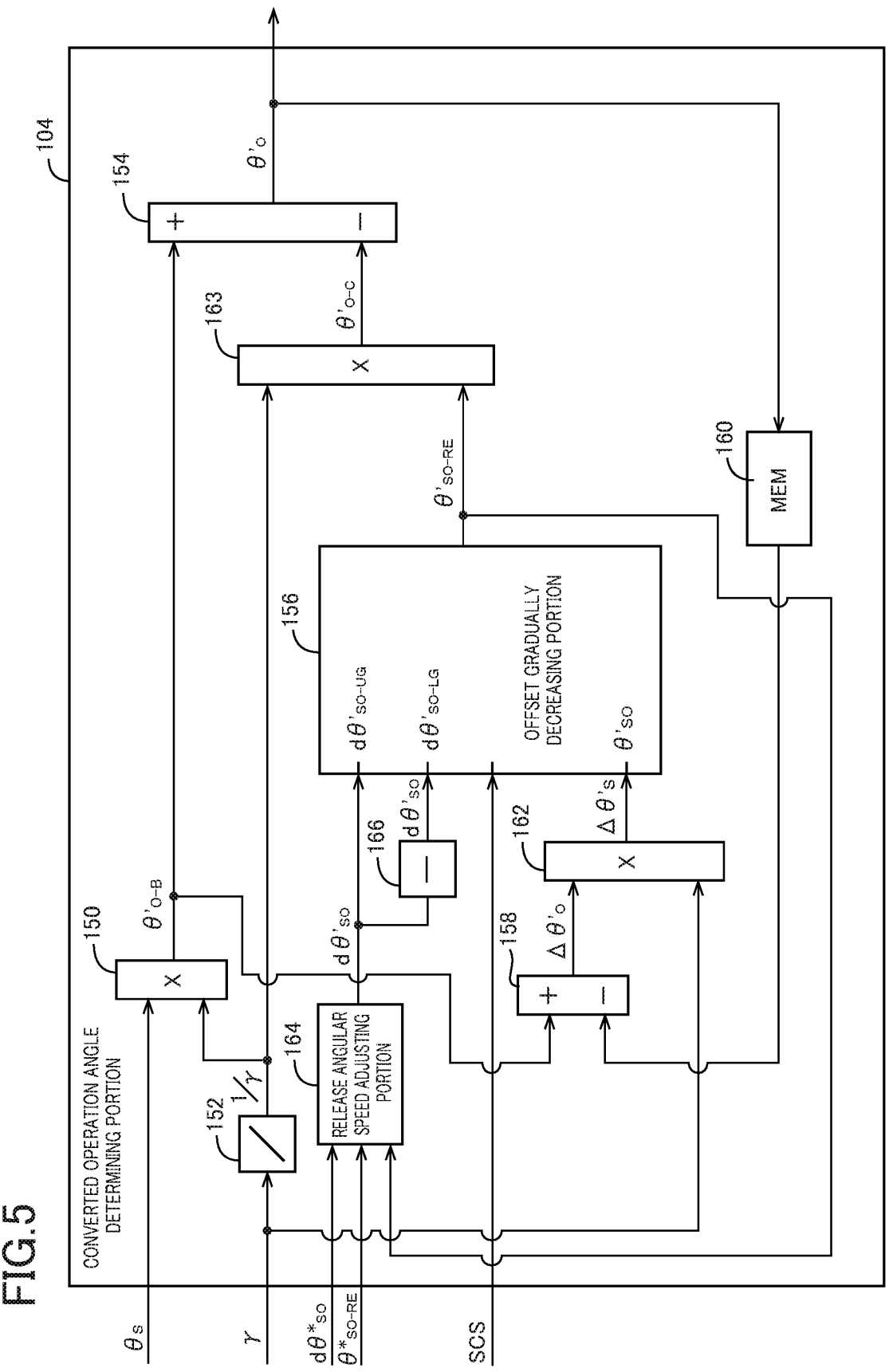
FIG. 5 is a block diagram illustrating a functional configuration of a converted operation angle determining portion of the controller of the steering system according to the embodiment.

The converted operation angle determining portion 104 has a functional configuration illustrated in a functional block diagram of FIG. 5. The converted operation angle determining portion 104 includes a multiplier 150, to which is input the actual steering angle $\theta_S$ of the wheel 16 from the steering angle converting portion 128 of the steering control section 102. The gear ratio $\gamma$ is input from the gear ratio determining portion 120 to the converted operation angle determining portion 104. The input gear ratio γ is converted by an inverse converter 152 to an inverse gear ratio 1/γ, which is an inverse of the gear ratio γ. The inverse gear ratio 1/γ is also input to the multiplier 150. The multiplier 150 multiplies the steering angle $\theta_S$ and the inverse gear ratio 1/γ to thereby determine a basic converted operation angle $\theta'_{O-B}$, which is a base of the converted operation angle $\theta'_O$.

The basic converted operation angle $\theta'_{O-B}$ is input to an adder-subtractor 154. A converted operation angle correction value $\alpha'_{O-C}$ (as one example of a converted operation amount correction value) that will be described is also input to the adder-subtractor 154. In the adder-subtractor 154, the basic converted operation angle $\theta'_{O-B}$ is corrected by the converted operation angle correction value $\alpha'_{O-C}$, so that the converted operation angle $\theta'_O$ is determined.

Like the target steering angle determining portion 122, the converted operation angle determining portion 104 determines the converted operation angle $\theta'_O$ so as to prevent the reaction force torque $Tq_C$ from abruptly changing, specifically, so as to prevent the operation-angle-deviation-dependent component $Tq_{C-O}$ from abruptly changing, in a case where the converted operation angle $\theta'_O$ abruptly changes due to an abrupt change of the inverse gear ratio 1/γ arising from an abrupt change of the gear ratio γ, in other words, in a case where the converted operation angle $\theta'_O$ changes stepwise comparatively largely. Specifically, the converted operation angle determining portion 104 also executes an offset release process similar to that executed by the target steering angle determining portion 122.

For executing the offset release process, the converted operation angle determining portion 104 also includes an offset gradually decreasing portion 156 similar to the offset gradually decreasing portion 136 of the target steering angle determining portion 122. The offset gradually decreasing portion 156 determines a converted steering offset remaining angle $\theta'_{SO-RE}$ (that will be later described), which is a base of the converted operation angle correction value $\theta'_{O-C}$.

Specifically, the converted operation angle determining portion 104 includes an adder-subtractor 158 and a previous value memory 160. The adder-subtractor 158 determines a converted operation angle gap $\Delta\theta'_O$ (as one example of a converted operation amount gap), which is a difference between the basic converted operation angle $\theta'_{O-B}$ in the current control cycle and the converted operation angle $\theta'_O$ in the previous control cycle. The converted operation angle gap $\Delta\theta'_O$ and the gear ratio γ are input to the multiplier 162. The multiplier 162 multiplies the converted operation angle gap $\Delta\theta'_O$ and the gear ratio γ to thereby determine a converted steering angle gap $\Delta\theta'_S$ (as one example of a converted steering amount gap), which corresponds to the converted operation angle gap $\Delta\theta'_O$. The converted steering angle gap $\Delta\theta'_S$ is input to the offset gradually decreasing portion 156. The steering-state change signal SCS described above is input also to the offset gradually decreasing portion 156. The offset gradually decreasing portion 156 grasps the converted steering angle gap $\Delta\theta'_S$ at a time point of input of the steering-state change signal SCS, namely, at a time point of occurrence of the abrupt change of the gear ratio γ, as a converted steering angle offset value $\theta'_{SO}$ (as one example of a converted steering amount offset value). Like the offset gradually decreasing portion 136, in the control cycle thereafter, the offset gradually decreasing portion 156 gradually decreases the converted steering angle offset value $\theta'_{SO}$ to 0 at an angular speed whose value is greater than an upper limit value $d\theta'_{SO-UG}$ and not less than a lower limit value $d\theta'_{SO-LG}$. Every time the control cycle proceeds, the offset gradually decreasing portion 156 outputs, to the multiplier 163, the gradually decreased converted steering angle offset value $\theta'_{SO}$ as the converted steering offset remaining angle $\theta'_{SO-RE}$ described above. The inverse gear ratio 1/γ is also input to the multiplier 163 from the inverse converter 152. The multiplier 163 multiplies the converted steering offset remaining angle $\theta'_{SO-RE}$ and the inverse gear ratio 1/γ to thereby determine the converted operation angle correction value $\theta'_{O-C}$. The determined converted operation angle correction value $\theta'_{O-C}$ is output to the adder-subtractor 154. In short, instead of merely executing the offset release process with respect to the converted operation angle $\theta'_O$, the converted operation angle determining portion 104 once converts the converted operation angle $\theta'_O$ to a converted steering angle $\theta'_S$ (as one example of a converted steering amount) utilizing the gear ratio γ, then executes the offset release process with respect to the converted steering angle $\theta'_S$, and finally re-converts the converted steering angle $\theta'_S$ that has undergone the offset release process to the converted operation angle $\theta'_O$ utilizing the inverse gear ratio 1/γ.

The upper limit value $d\theta'_{SO-UG}$ and the lower limit value $d\theta'_{SO-LG}$ in the offset gradually decreasing portion 156 of the converted operation angle determining portion 104 are determined such that the speed of the offset release process executed with respect to the converted steering angle $\theta'_S$, i.e., the offset release angular speed $d\theta'_{SO}$, is adjusted to the offset release angular speed $d\theta^*_{SO}$, which is the speed of the offset release process executed with respect to the target steering angle $\theta^*$ in the target steering angle determining portion 122. Specifically, the converted operation angle determining portion 104 includes a release angular speed adjusting portion 164. The offset release angular speed $d\theta'_{SO}$ determined by the release angular speed adjusting portion 164 is set to the upper limit value $d\theta'_{SO-UG}$ in the offset gradually decreasing portion 156, and a value obtained by reversing the sign of the offset release angular speed $d\theta'_{SO}$ by a converter 166, i.e., $-d\theta'_{SO}$, is set to the lower limit value $d\theta'_{SO-LG}$ in the offset gradually decreasing portion 156.

The processing executed by the release angular speed adjusting portion 164 will be described. The release angular speed adjusting portion 164 has a functional configuration illustrated by a functional block diagram of FIG. 6. There are input, to the release angular speed adjusting portion 164, the target steering offset remaining angle $\theta^*_{SO-RE}$ from the target steering angle determining portion 122 and the converted steering offset remaining angle $\theta'_{SO-RE}$ determined by the offset gradually decreasing portion 156. The target steering offset remaining angle $\theta^*_{SO-RE}$ is input to an absolute value generator 168 so as to obtain an absolute value $|\theta^*_{SO-RE}|$ of the target steering offset remaining angle $\theta^*_{SO-RE}$, and the converted steering offset remaining angle $\theta'_{SO-RE}$ is input to an absolute value generator 170 so as to obtain an absolute value $|\theta'_{SO-RE}|$ of the converted steering offset remaining angle $\theta'_{SO-RE}$. An adder-subtractor 172 obtains an offset remaining angle difference $\Delta\theta_{SOR}$, which is a difference between the absolute value $|\theta^*_{SO-RE}|$ and the absolute value $|\theta'_{SO-RE}|$. The release angular speed adjusting portion 164 includes a gain determining portion 174 that determines an adjustment gain G. The adjustment gain G is considered as a coefficient for adjusting the speed of the offset release process executed with respect to the converted steering angle $\theta'_S$ to the offset release angular speed $d\theta^*_{SO}$, which is the speed of the offset release process executed with respect to the target steering angle $\theta^*$. As illustrated in FIG. 6, the adjustment gain G is determined to be 1 when the offset remaining angle difference $\Delta\theta_{SOR}$ is close to 0. When the target steering offset remaining angle $\theta^*_{SO-RE}$ is greater than the converted steering offset remaining angle $\theta'_{SO-RE}$ by a certain degree, the adjustment gain G is determined to be a greater value with an increase in the offset remaining angle difference $\Delta\theta_{SOR}$ for increasing the speed of the offset release process executed with respect to the converted steering angle $\theta'_S$. When the target steering offset remaining angle $\theta^*_{SO-RE}$ is less than the converted steering offset remaining angle $\theta'_{SO-RE}$ by a certain degree, the adjustment gain G is determined to be a smaller value with an increase in the absolute value of the offset remaining angle difference $\Delta\theta_{SOR}$ for decreasing the speed of the offset release process executed with respect to the converted steering angle $\theta'_S$. The adjustment gain G determined by the gain determining portion 174 is input to the multiplier 176. The multiplier 176, to which the offset release angular speed $d\theta^*_{SO}$ for the target steering angle $\theta^*_S$ is input from the target steering angle determining portion 122, multiplies the offset release angular speed $d\theta^*_{SO}$ and the adjustment gain G to thereby determine the offset release angular speed $d\theta'_{SO}$.

C. Converted Operation Angle Determined in Case of Occurrence of Abrupt Change of Gear Ratio As described above, the converted operation angle determining portion 104 executes the correction process described above, namely, the correction process based on the converted operation angle correction value, in determining the converted operation angle $\theta'_O$. There will be hereinafter described the determination of the converted operation angle by the converted operation angle determining portion 104 in case of occurrence of the abrupt change of the gear ratio $\gamma$ while comparing with a determination of the converted operation angle by another employable converted operation angle determining portion. The comparison below is carried out on the preconditions that the steering system is regarded as being in the vehicle-speed unavailable state when the operation angle $\theta_O$ of the steering wheel 10 is 100 degrees (deg.) and that the gear ratio $\gamma$ abruptly changes from 4.0 to 2.0.

a. Measure to be Taken when Steering of Wheel does not Follow Steering Operation In place of the converted operation angle determining portion 104 described above, it may be possible to employ a converted operation angle determining portion 180 having a functional configuration illustrated in a block diagram of FIG. 7, for instance. The converted operation angle determining portion 180 includes an adder-subtractor 182, an inverse converter 184, and a multiplier 186. There are input, to the adder-subtractor 182, the actual steering angle $\theta_S$ and the target steering offset remaining angle $\theta^*_{SO-RE}$ from the offset gradually decreasing portion 136 of the target steering angle determining portion 122. The adder-subtractor 182 adds up the actual steering angle $\theta_S$ and the target steering offset remaining angle $\theta^*_{SO-RE}$ to thereby determine an offset steering angle $\theta_{S-O}$. The inverse converter 184 converts the gear ratio $\gamma$ input from the gear ratio determining portion 120 to the inverse gear ratio $1/\gamma$. The multiplier 186 multiplies the inverse gear ratio $1/\gamma$ and the offset steering angle $\theta_{S-O}$, so that the converted operation angle $\theta'_O$ is determined.

The table of FIG. 8A illustrates results of the converted operation angle determining process executed by the converted operation angle determining portion 180 illustrated in FIG. 7. First, a case is considered in which steering of the wheel 16 adequately follows the steering operation. In this case, in a state immediately before the vehicle speed becomes unavailable, the steering angle $\theta_S$ is 400 deg., the gear ratio $\gamma$ is 4.0, and the target steering offset remaining angle $\theta^*_{SO-RE}$ is 0 deg. In the converted operation angle determining portion 180, the offset steering angle $\theta_{S-O}$ is determined to be 400 deg., and the converted operation angle determining portion 180 outputs 100 deg. as the converted operation angle $\theta'_O$. In a state immediately after the vehicle speed becomes unavailable, the steering angle $\theta_S$ does not change. Even though the gear ratio $\gamma$ input to the converted operation angle determining portion 180 abruptly changes to 2.0, the target steering offset remaining angle $\theta^*_{SO-RE}$ input to the converted operation angle determining portion 180 is −200 deg. Consequently, the offset steering angle $\theta_{S-O}$ is determined to be 200 deg., and the converted operation angle determining portion 180 outputs 100 deg. as the converted operation angle $\theta'_O$. Thus, when steering of the wheel 16 adequately follows the steering operation, the converted operation angle $\theta'_O$ does not change even when the gear ratio $\gamma$ abruptly changes.

Next, a case is considered in which steering of the wheel 16 does not follow the steering operation in a situation in which the wheel 16 hits on a curb or the like. Specifically, there is considered a case in which the steering angle $\theta_S$ reaches only 300 deg. though the operation angle is 100 deg. In this case, in the state immediately before the vehicle speed becomes unavailable, the steering angle $\theta_S$ is 300 deg., the gear ratio $\gamma$ is 4.0, and the target steering offset remaining angle $\theta^*_{SO-RE}$ is 0 deg. In the converted operation angle determining portion 180, the offset steering angle $\theta_{S-O}$ is determined to be 300 deg., and the converted operation angle determining portion 180 outputs 75 deg. as the converted operation angle $\theta'_O$. In the state immediately after the vehicle speed becomes unavailable, the steering angle $\theta_S$ does not change. Though the gear ratio $\gamma$ input to the converted operation angle determining portion 180 abruptly changes to 2.0, the target steering offset remaining angle $\theta^*_{SO-RE}$ input to the converted operation angle determining portion 180 is −200 deg. Consequently, the offset steering angle $\theta_{S-O}$ is determined to be 100 deg., and the converted operation angle determining portion 180 outputs 50 deg. as the converted operation angle $\theta'_O$. Thus, when steering of the wheel 16 does not follow the steering operation, the converted operation angle $\theta'_O$ abruptly changes due to the abrupt change of the gear ratio $\gamma$, undesirably causing the operation reaction force to be changed.

The table of FIG. 8B illustrates results of the converted operation angle determining process executed by the converted operation angle determining portion 104 of the steering system according to the present embodiment. First, a case is considered in which steering of the wheel 16 adequately follows the steering operation. In this case, in a state immediately before the vehicle speed becomes unavailable, the gear ratio $\gamma$ is 4.0, the steering angle $\theta_S$ is 400 deg., and the basic converted operation angle $\theta'_{O-B}$ is 100 deg. All of the converted operation angle gap $\Delta\theta'_O$, the converted steering angle gap $\Delta\theta'_S$, the converted steering offset remaining angle $\theta'_{SO-RE}$, and the converted operation angle correction value $\theta'_{O-C}$ are 0 deg., and the converted operation angle determining portion 104 outputs 100 deg. as the converted operation angle $\theta'_O$. In a state immediately after the vehicle speed becomes unavailable, the steering angle $\theta_S$ does not change. Though the gear ratio $\gamma$ abruptly changes to 2.0, the basic converted operation angle $\theta'_{O-B}$ is 200 deg., the converted operation angle gap $\Delta\theta'_O$ is 100 deg., the converted steering angle gap $\Delta\theta'_S$ is 200 deg., the converted steering offset remaining angle $\theta'_{SO-RE}$ is 200 deg., and the converted operation angle correction value $\theta'_{O-C}$ is 100 deg. Consequently, the converted operation angle determining portion 104 outputs 100 deg. as the converted operation angle $\theta'_O$. Thus, when steering of the wheel 16 adequately follows the steering operation, the converted operation angle $\theta'_O$ does not change even when the gear ratio $\gamma$ abruptly changes.

Next, a case is considered in which steering of the wheel 16 does not follow the steering operation and the steering angle $\theta_S$ reaches only 300 deg. In this case, in the state immediately before the vehicle speed becomes unavailable, the steering angle $\theta_S$ is 300 deg., the gear ratio $\gamma$ is 4.0, the basic converted operation angle $\theta'_{O-B}$ is 75 deg., and all of the converted operation angle gap $\Delta\theta'_O$, the converted steering angle gap $\Delta\theta'_S$, the converted steering offset remaining angle $\theta'_{SO-RE}$, and the converted operation angle correction value $\theta'_{O-C}$ are 0 deg. The converted operation angle determining portion 104 outputs 75 deg. as the converted operation angle $\theta'_O$. In the state immediately after the vehicle speed becomes unavailable, the steering angle $\theta_S$ does not change, namely, remains 300 deg. Though the gear ratio $\gamma$ abruptly changes to 2.0, the basic converted operation angle $\theta'_{O-B}$ is 150 deg., the converted operation angle gap $\Delta\theta'_O$ is 75 deg., the converted steering angle gap $\Delta\theta'_S$ is 150 deg., the converted steering offset remaining angle $\theta'_{SO-RE}$ is 150 deg., and the converted operation angle correction value $\theta'_{O-C}$ is 75 deg. The converted operation angle determining portion 104 outputs 75 deg. as the converted operation angle $\theta'_O$. Thus, the converted operation angle $\theta'_O$ determined by the converted operation angle determining portion 104 does not change due to the abrupt change of the gear ratio $\gamma$ even when steering of the wheel 16 does not follow the steering operation. That is, the steering system according to the present embodiment effectively deals with the abrupt change of the gear ratio $\gamma$ caused when steering of the wheel 16 does not follow the steering operation.

b. Measures to be Taken for Dealing with Change of Gear Ratio During Offset Release Process after Abrupt Change of Gear Ratio The target steering angle determining portion 122 determines the target steering angle offset value $\theta^*_{SO}$ at the time point of occurrence of the abrupt change of the gear ratio $\gamma$. As the control cycle proceeds thereafter, the target steering angle determining portion 122 executes the process of gradually decreasing the target steering angle offset value $\theta^*_{SO}$, i.e., the offset release process. In the steering system according to the present embodiment, the converted operation angle determining portion 104 also executes the offset release process after occurrence of the abrupt change of the gear ratio $\gamma$.

Figure 9:
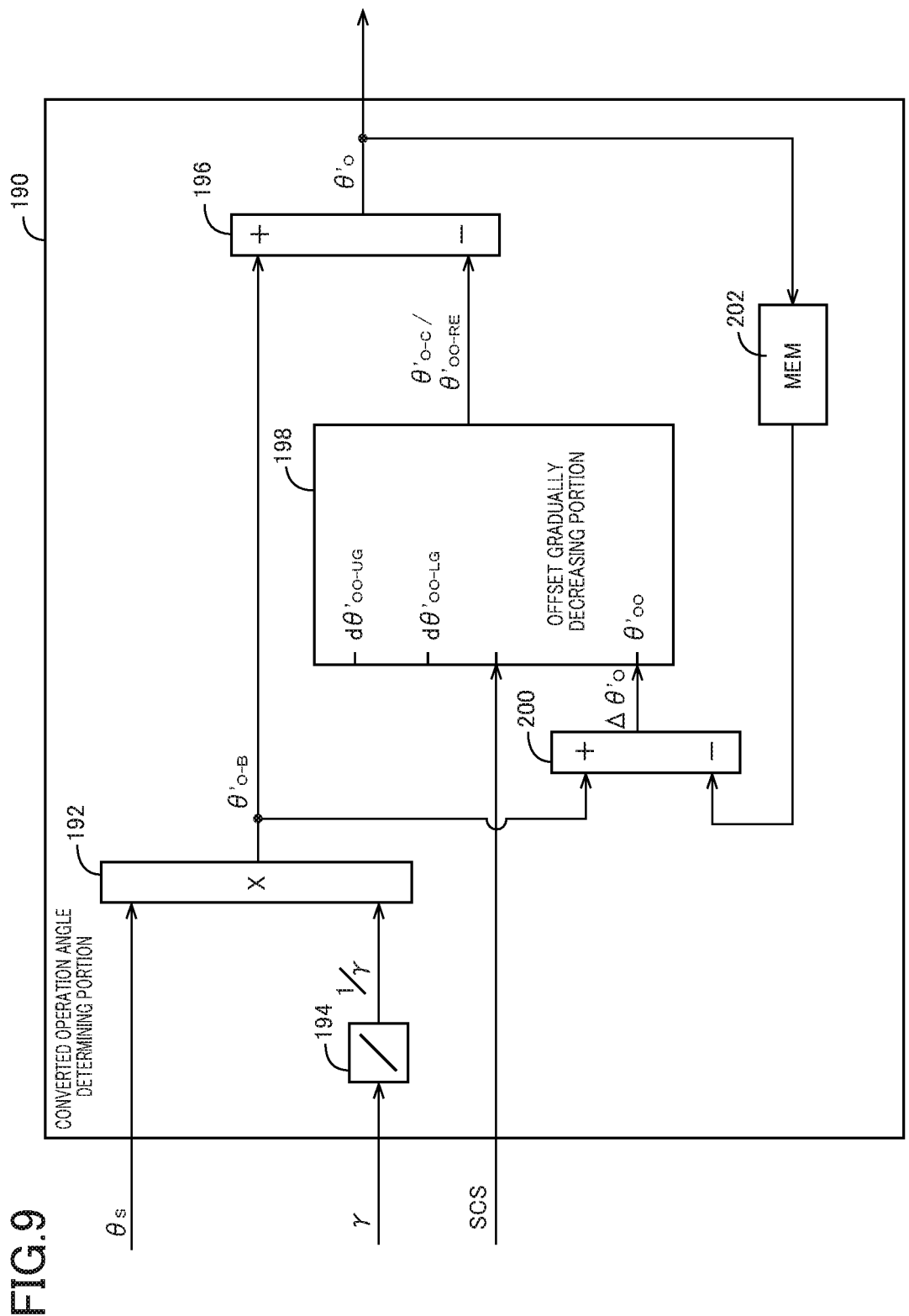
FIG. 9 is a block diagram illustrating a functional configuration of a converted operation angle determining portion as another comparative example different from the converted operation angle determining portion illustrated in the block diagram of FIG. 5.

For relatively simply executing the offset release process in the determination of the converted operation angle $\theta'_O$, it may be possible to employ, for instance, a converted operation angle determining portion 190 having a functional configuration illustrated in a block diagram of FIG. 9. Like the converted operation angle determining portion 104, the converted operation angle determining portion 190 includes a multiplier 192, to which is input the actual steering angle $\theta_S$ of the wheel 16 from the steering angle converting portion 128 of the steering control section 102. The gear ratio $\gamma$ is input to the converted operation angle determining portion 190 from the gear ratio determining portion 120. The gear ratio $\gamma$ is converted by an inverse converter 194 to an inverse gear ratio $1/\gamma$, which is an inverse of the gear ratio $\gamma$. The inverse gear ratio $1/\gamma$ is also input to the multiplier 192. The multiplier 192 multiplies the steering angle $\theta_S$ and the inverse gear ratio $1/\gamma$ to thereby determine the basic converted operation angle $\theta'_{O-B}$, which is a base of the converted operation angle $\theta'_O$.

Like the converted operation angle determining portion 104, the converted operation angle determining portion 190 includes an adder-subtractor 196, to which is input the basic converted operation angle $\theta'_{O-B}$. The converted operation angle correction value $\theta'_{O-C}$ is also input to the adder-subtractor 196. The adder-subtractor 196 corrects the basic converted operation angle $\theta'_{O-B}$ based on the converted operation angle correction value $\theta'_{O-C}$, so that the converted operation angle $\theta'_O$ is determined.

The converted operation angle determining portion 190 includes an offset gradually decreasing portion 198 for executing the offset release process. The offset gradually decreasing portion 156 of the converted operation angle determining portion 104 outputs the converted steering offset remaining angle $\theta'_{SO-RE}$ described above whereas the offset gradually decreasing portion 198 of the converted operation angle determining portion 190 outputs a converted operation offset remaining angle $\theta'_{OO-RE}$ (that will be described) as the converted operation angle correction value $\theta'_{O-C}$.

Specifically, the converted operation angle determining portion 190 includes an adder-subtractor 200 and a previous value memory 202. The adder-subtractor 200 determines the converted operation angle gap $\Delta\theta'_O$ (as one example of the converted operation amount gap), which is a difference between the basic converted operation angle $\theta'_{O-B}$ in the current control cycle and the converted operation angle $\theta'_O$ in the previous control cycle. In the converted operation angle determining portion 190, the converted operation angle gap $\Delta\theta'_O$ is directly input to the offset gradually decreasing portion 198. The steering-state change signal SCS described above is input also to the offset gradually decreasing portion 198. The offset gradually decreasing portion 198 grasps the converted operation angle gap $\Delta\theta'_O$ at a time point of input of the steering-state change signal SCS, namely, at a time point of occurrence of the abrupt change of the gear ratio $\gamma$, as a converted operation angle offset value $\theta'_{OO}$. In the control cycle thereafter, the offset gradually decreasing portion 198 gradually decreases the converted operation angle offset value $\theta'_{OO}$ (as one example of a converted operation amount offset value) to 0 at an angular speed whose value is not greater than an upper limit value $d\theta'_{OO-UG}$ and not less than a lower limit value $d\theta'_{OO-LG}$. Every time the control cycle proceeds, the offset gradually decreasing portion 198 outputs, to the adder-subtractor 196, the gradually decreased converted operation angle offset value $\theta'_{OO}$ as the converted operation offset remaining angle $\theta'_{OO-RE}$ described above. In short, the converted operation angle determining portion 190 simply executes the offset release process with respect to the converted operation angle $\theta'_O$, unlike the converted operation angle determining portion 104.

There will be considered a determining process of determining the converted operation angle $\theta'_O$, which involves the offset release process, executed by the converted operation angle determining portion 190. The converted operation angle $\theta'_O$ is determined on the following preconditions. The steering system is regarded as being in the vehicle-speed unavailable state when the operation angle $\theta_O$ of the steering wheel 10 is 100 deg., the gear ratio $\gamma$ abruptly changes from 4.0 to 2.0, a steering-angle increasing motion of the steering wheel 10 is thereafter performed, and the operation angle $\theta_O$ reaches 105 deg. Further, steering of the wheel 16 adequately follows the steering operation.

The table of FIG. 10A illustrates results of the converted operation angle determining process executed by the converted operation angle determining portion 190. In a state immediately before the vehicle speed becomes unavailable, the gear ratio $\gamma$ is 4.0, the steering angle $\theta_S$ is 400 deg., and the basic converted operation angle $\theta'_{O-B}$ is 100 deg. The converted operation angle gap $\Delta\theta'_O$ and the converted operation offset remaining angle $\theta'_{OO\text{-}RE}$, i.e., the converted operation angle correction value $\theta'_{O\text{-}C}$, are both 0 deg., and the converted operation angle determining portion 190 outputs 100 deg. as the converted operation angle $\theta'_O$. In a state immediately after the vehicle speed becomes unavailable, the steering angle $\theta_S$ does not change. Even though the gear ratio γ abruptly changes to 2.0, the converted operation angle determining portion 190 outputs 100 deg. as the converted operation angle $\theta'_O$ because the basic converted operation angle $\theta'_{O\text{-}B}$ is 200 deg., the converted operation angle gap $\Delta\theta'_O$ is 100 deg., and the converted operation offset remaining angle $\theta'_{OO\text{-}RE}$, i.e., the converted operation angle correction value $\theta'_{O\text{-}C}$, is 100 deg.

Next, a case is considered in which the gear ratio γ does not change when the operation angle $\theta_O$ reaches 105 deg. while offset release process is executed. In this case, if the target steering offset remaining angle $\theta^*_{SO\text{-}RE}$ is 197 deg. in the target steering angle determining portion 122 by execution of the offset release process, the target steering angle determining portion 122 outputs 407 deg. as the target steering angle $\theta^*_S$, the steering angle $\theta_S$ is 407 deg, and the basic converted operation angle $\theta'_{O\text{-}B}$ is determined to be 203.5 deg. in the converted operation angle determining portion 190. If it is assumed that the offset release process in the converted operation angle determining portion 190 proceeds in synchronism with the offset release process in the target steering angle determining portion 122, the converted operation offset remaining angle $\theta'_{OO\text{-}RE}$ is determined to be 98.5 deg. Consequently, the converted operation angle $\theta'_O$ is 105 deg., which is the same as the operation angle $\theta_O$.

As apparent from the gear ratio determination map of FIG. 3, namely, as apparent from the speed-unavailable-state relationship line in the map of FIG. 3, the gear ratio γ actually changes in dependence on the operation angle $\theta_O$ of the steering wheel 10 in the vehicle-speed unavailable state. It is accordingly needed to consider the change of the gear ratio γ in the middle of the offset release process.

When the operation angle $\theta_O$ shifts from 100 deg. to 105 deg. in the middle of the offset release process and the gear ratio γ changes from 2.0 to 2.05 according to the speed-unavailable-state relationship line, the target steering offset remaining angle $\theta^*_{SO\text{-}RE}$ is determined to be 197 deg. in the target steering angle determining portion 122, the target steering angle determining portion 122 outputs 412.25 deg. as the target steering angle $\theta^*_S$, and the steering angle $\theta_S$ is 412.25 deg. In the converted operation angle determining portion 190, the basic converted operation angle $\theta'_{O\text{-}B}$ is determined to be 201.10 deg., and the converted operation offset remaining angle $\theta'_{OO\text{-}RE}$ is determined to be 98.5 deg. Consequently, the converted operation angle $\theta'_O$ is 102.60 deg., which is different from the operation angle $\theta_O$.

Unlike the converted operation angle determining portion 190 described above, the converted operation angle determining portion 104 of the steering system according to the present embodiment determines the converted operation angle $\theta'_O$ in the following manner.

The table of FIG. 10B illustrates results of the converted operation angle determining process executed by the converted operation angle determining portion 104. In a state immediately before the vehicle speed becomes unavailable, the gear ratio γ is 4.0, the steering angle $\theta_S$ is 400 deg., the basic converted operation angle $\theta'_{O\text{-}B}$ is 100 deg., and all of the converted operation angle gap $\Delta\theta'_O$, the converted steering angle gap $\Delta\theta'_S$, the converted steering offset remaining angle $\theta'_{SO\text{-}RE}$, and the converted operation angle correction value $\theta'_{O\text{-}C}$ are 0 deg. Consequently, the converted operation angle determining portion 104 outputs 100 deg. as the converted operation angle $\theta'_O$. In a state immediately after the vehicle speed becomes unavailable, the steering angle $\theta_S$ does not change. Even though the gear ratio γ abruptly changes to 2.0, the converted operation angle determining portion 104 outputs 100 deg. as the converted operation angle $\theta'_O$ because the basic converted operation angle $\theta'_{O\text{-}B}$ is 200 deg., the converted operation angle gap $\Delta\theta'_O$ is 100 deg., the converted steering angle gap $\Delta\theta'_S$ is 200 deg., the converted steering offset remaining angle $\theta'_{SO\text{-}RE}$ is 200 deg., and the converted operation angle correction value $\theta'_{O\text{-}C}$ is 100 deg.

When the operation angle $\theta_O$ shifts from 100 deg. to 105 deg. in the middle of the offset release process, the steering angle $\theta_S$ is 407 deg. if the gear ratio γ remains 2.0, as described above with respect to the converted operation angle determining portion 190. In the converted operation angle determining portion 104, the basic converted operation angle $\theta'_{O\text{-}B}$ is determined to be 203.5 deg. If it is assumed that the offset release process in the converted operation angle determining portion 104 proceeds in synchronism with the offset release process in the target steering angle determining portion 122, the converted steering offset remaining angle $\theta'_{SO\text{-}RE}$ is 197 deg. and the converted operation angle correction value $\theta'_{O\text{-}C}$ is 98.5 deg. Consequently, the converted operation angle determining portion 104 outputs 105 deg. as the converted operation angle $\theta'_O$, which is the same as the operation angle $\theta_O$.

When the operation angle $\theta_O$ shifts from 100 deg. to 105 deg. in the middle of the offset release process and the gear ratio γ changes from 2.0 to 2.05, the steering angle $\theta_S$ is 412.25 deg. as a result of the process executed by the target steering angle determining portion 122. In the converted operation angle determining portion 104, the basic converted operation angle $\theta'_{O\text{-}B}$ is determined to be 201.10 deg., the converted steering offset remaining angle $\theta'_{SO\text{-}RE}$ is determined to be 197 deg., and the converted operation angle correction value $\theta'_{O\text{-}C}$ is determined to be 96.10 deg. Consequently, the converted operation angle determining portion 104 outputs 105 deg. as the converted operation angle $\theta'_O$, which is the same as the operation angle $\theta_O$.

As described above, the converted operation angle determining portion 104 enables the converted operation angle $\theta'_O$ to be appropriately obtained in the steering operation that involves the offset release process executed after the abrupt change of the gear ratio γ, irrespective of whether or not the gear ratio γ changes. In other words, the converted operation angle determining portion 104 deals with the change of the gear ratio γ that is caused in the middle of the offset release process after the gear ratio γ has abruptly changed. The advantages offered by the converted operation angle determining portion 104 are based on the configuration of the converted operation angle determining portion 104 described above. That is, instead of simply executing the offset release process with respect to the converted operation angle $\theta'_O$, the converted operation angle determining portion 104 once converts the converted operation angle $\theta'_O$ to the converted steering angle $\theta'_S$ utilizing the gear ratio γ, then executes the offset release process with respect to the converted steering angle $\theta'_S$, and finally re-converts the converted steering angle $\theta'_S$ that has undergone the offset release process to the converted operation angle $\theta'_O$ utilizing the inverse gear ratio 1/γ.

What is claimed is:

1. A steer-by-wire steering system for a vehicle, comprising: an operation member operable by a driver; a reaction force applying device configured to apply an operation reaction force to the operation member; a steering device configured to steer a wheel; and a controller configured to control the reaction force applying device and the steering device, wherein the controller is configured to execute:
a steering control process in which the controller determines a steering gear ratio and controls the steering device such that a ratio of a steering amount of the wheel with respect to an operation amount of the operation member becomes equal to the steering gear ratio;
a converted operation amount determining process in which the controller converts an actual steering amount of the wheel to the operation amount of the operation member based on an inverse of the determined steering gear ratio, so as to determine a converted operation amount; and
a reaction force control process in which, based on an operation amount deviation that is a difference between an actual operation amount of the operation member and the converted operation amount, the controller controls the reaction force applying device such that the operation reaction force increases with an increase in the operation amount deviation, wherein, in the converted operation amount determining process,
when the determined steering gear ratio abruptly changes, the controller converts, based on the steering gear ratio, a gap of the converted operation amount generated at a time point of occurrence of the abrupt change to a gap of the steering amount of the wheel, so as to grasp the gap of the steering amount of the wheel as a converted steering amount offset value,
the controller thereafter re-converts the converted steering amount offset value to the gap of the converted operation amount based on the inverse of the steering gear ratio while gradually decreasing the converted steering amount offset value, so as to determine a converted operation amount correction value, and
the controller corrects the converted operation amount based on the converted operation amount correction value.

2. The steer-by-wire steering system according to claim 1, wherein, in the steering control process,
the controller determines, based on the actual operation amount of the operation member and the steering gear ratio, a target steering amount that is the steering amount of the wheel to be attained and controls the steering device such that the actual steering amount of the wheel becomes equal to the target steering amount, and
when the determined steering gear ratio abruptly changes, the controller grasps a gap of the target steering amount generated at the time point of occurrence of the abrupt change as a target steering amount offset value,
the controller thereafter gradually decreases the target steering amount offset value to determine a target steering amount correction value, and
the controller corrects the target steering amount based on the target steering amount correction value.

3. The steer-by-wire steering system according to claim 2, wherein, in the converted operation amount determining process, the controller gradually decreases the converted steering amount offset value in accordance with the gradual decrease of the target steering amount offset value in the steering control process.

4. The steer-by-wire steering system according to claim 1, wherein, in the steering control process, the controller executes a gear ratio determining process in which the controller determines the steering gear ratio based on the operation amount of the operation member and a traveling speed of the vehicle.

5. The steer-by-wire steering system according to claim 4, wherein, in the gear ratio determining process, when the traveling speed of the vehicle is unavailable, the controller determines the steering gear ratio not based on the traveling speed of the vehicle, and
wherein the controller identifies that the determined steering gear ratio abruptly changes when the traveling speed of the vehicle is unavailable.

6. The steer-by-wire steering system according to claim 1, wherein, in the reaction force control process, the controller determines the operation reaction force to be applied by synthesizing a plurality of components and controls the reaction force applying device based on the determined operation reaction force, and
wherein the plurality of components includes an assist component for assisting an operation of the operation member by the driver, a steering-load-dependent component that is based on a load of the steering device with respect to steering of the wheel, and an operation-amount-deviation-dependent component that is based on the operation amount deviation.

* * * * *